United States Patent
Kuo et al.

(10) Patent No.: US 9,043,842 B2
(45) Date of Patent: May 26, 2015

(54) METHOD FOR VIRTUAL CHANNEL MANAGEMENT, METHOD FOR RETRIEVING DIGITAL CONTENTS, AND NETWORK-BASED MULTIMEDIA REPRODUCTION SYSTEM WITH VIRTUAL CHANNELS

(71) Applicant: Wistron Corporation, New Taipei (TW)

(72) Inventors: Fang-Wen Kuo, New Taipei (TW); Po-Hsu Chen, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 13/716,248

(22) Filed: Dec. 17, 2012

(65) Prior Publication Data

US 2013/0312039 A1     Nov. 21, 2013

(30) Foreign Application Priority Data

May 16, 2012 (TW) .............................. 101117473 A (51) Int. Cl.
*H04N 5/445* (2011.01)
*G06F 3/00* (2006.01)
(Continued)

(52) U.S. Cl.
CPC .... *H04N 21/435* (2013.01); *H04N 2005/44556* (2013.01); *H04N 2005/44573* (2013.01); *H04N 2005/44578* (2013.01); *H04N 21/42204* (2013.01); *H04N 21/478* (2013.01); *H04N 21/8173* (2013.01)

(58) Field of Classification Search
None
See application file for complete search history.

(56) References Cited

U.S. PATENT DOCUMENTS 5,914,746 A * 6/1999 Matthews et al. .............. 725/132
7,818,321 B2 * 10/2010 Hegde et al. .................. 707/736

(Continued)

FOREIGN PATENT DOCUMENTS

| EP | 1267572 A2 | 12/2002 |
| JP | 2005522955 | 7/2005 |

(Continued)

OTHER PUBLICATIONS

English Abstract translation of KR1020050119328 (Published Dec. 21, 2005).

(Continued)

*Primary Examiner* — Nasser Goodarzi
*Assistant Examiner* — Adil Ocak
(74) *Attorney, Agent, or Firm* — McClure, Qualey & Rodack, LLP (57) ABSTRACT

A method for virtual channel management is provided. The method includes the following steps. In response to a command, a control unit of a network-based multimedia reproduction system determines whether the command is associated with virtual channel switching. When the command is associated with virtual channel switching, the control unit checks whether a channel value corresponding to the command exists in an application virtual channel table. When the channel value exists in the application virtual channel table, the control unit determines an application corresponding to the channel number from the application virtual channel table, and executes the application. According to a first operation parameter set corresponding to the application, the control unit sets the executed application to retrieve digital contents through a network unit of the network-based multimedia reproduction system.

17 Claims, 6 Drawing Sheets

(51) Int. Cl.
*G06F 13/00* (2006.01)
*H04N 21/435* (2011.01)
*H04N 21/422* (2011.01)
*H04N 21/478* (2011.01)
*H04N 21/81* (2011.01)

(56) References Cited

U.S. PATENT DOCUMENTS

| | | | |
|---|---|---|---|
| 7,941,564 B2* | 5/2011 | Gebhardt et al. | 709/248 |
| 8,434,124 B2 | 4/2013 | Lynch | |
| 2002/0157098 A1* | 10/2002 | Zustak et al. | 725/51 |
| 2003/0115595 A1* | 6/2003 | Stevens et al. | 725/32 |
| 2006/0020974 A1* | 1/2006 | Birnbaum et al. | 725/50 |
| 2006/0064583 A1 | 3/2006 | Birnbaum et al. | |
| 2006/0184965 A1* | 8/2006 | Lee et al. | 725/39 |
| 2007/0094292 A1 | 4/2007 | Kataoka | |
| 2008/0235728 A1 | 9/2008 | Kim | |
| 2008/0298274 A1* | 12/2008 | Takashige et al. | 370/254 |
| 2012/0101966 A1 | 4/2012 | van Coppenolle et al. | |

FOREIGN PATENT DOCUMENTS

| | | |
|---|---|---|
| KR | 1020050119328 | 12/2005 |
| KR | 1020100002755 | 1/2010 |

OTHER PUBLICATIONS

English Abstract translation of KR1020100002755 (Published Jan. 7, 2010).
Korea Office Action dated Feb. 7, 2014.
JP Office Action dated Jan. 7, 2014.
JP Office Action with English translation dated May 13, 2014.
EPO Search Report dated Dec. 1, 2014.
TW Office Action dated Nov. 26, 2014.
Partial English translation of TW Office Action dated Nov. 26, 2014.
TW Office Action dated Aug. 28, 2014.
Partial English translation of TW Office Action dated Aug. 28, 2014.

\* cited by examiner

METHOD FOR VIRTUAL CHANNEL MANAGEMENT, METHOD FOR RETRIEVING DIGITAL CONTENTS, AND NETWORK-BASED MULTIMEDIA REPRODUCTION SYSTEM WITH VIRTUAL CHANNELS

This application claims the benefit of Taiwan application Ser. No. 101117473, filed May 16, 2012, the subject matter of which is incorporated herein by reference.

BACKGROUND OF THE INVENTION

1. Field of the Invention

The invention relates in general to a method and apparatus for processing channels of a network-based multimedia reproduction system, and more particularly to a method for virtual channel management, a method for retrieving digital contents, and a network-based multimedia reproduction system with virtual channels.

2. Description of the Related Art

When watching conventional television programs based on wired or wireless RF broadcasting, users can easily select a desired program channel for watching by directly entering a channel number or pressing up and down arrow buttons for increasing or decreasing a channel number. More specifically, a user only needs to enter a number or press up and down arrow buttons for increasing and decreasing a number though a remote controller with one hand.

In addition, transmitting video images via the broadband Internet is currently a prevalent alternative way for watching videos or television programs. To put an Internet video function or Internet TV to use, a corresponding application (i.e., App) needs to be installed in advance or installed by a user. Each application has its dedicated user interface and approach of providing contents. A user generally selects desired contents by employing four direction buttons (i.e., up, down, left and right arrow buttons), a confirm or select button, and a back or return button. The above operations are far more sophisticated than simply entering a number or increasing/decreasing a number. Further, a user needs to look directly and attentively at a screen in order to select desired contents. However, with diversified contents and types rendered by the Internet, a relaxed atmosphere of enjoying watching the television as originally intended may instead become rather tense and serious.

SUMMARY OF THE INVENTION

The invention is directed to a method for virtual channel management, a method for retrieving digital contents, and a network-based multimedia reproduction system with virtual channels.

According to an embodiment of the present invention, a method for virtual channel management is provided. The method includes the following steps. In response to a command, a control unit of a network-based multimedia reproduction system determines whether the command is associated with virtual channel switching. When the command is associated with virtual channel switching, the control unit checks whether a channel value corresponding to the command exists in an application virtual channel table. When the channel value exists in the application virtual channel table, the control unit determines an application corresponding to the channel number from the application virtual channel table, and executes the application. According to a first operation parameter set corresponding to the application, the control unit sets the executed application to retrieve digital contents through a network unit of the network-based multimedia reproduction system.

According to another embodiment of the present invention, a network-based multimedia reproduction system with virtual channels is provided. The network-based multimedia reproduction system includes a display unit, a storage unit, a control unit, and a network unit. The storage unit stores an application virtual channel table. In response to a command, the control unit determines whether the command is associated with virtual channel switching. When the command is associated with virtual channel switching, the control unit checks whether a channel value corresponding to the command exists in an application virtual channel table. When the channel value exists in the application virtual channel table, the control unit determines an application corresponding to the channel number from the application virtual channel table and executes the application. The control unit sets the executed application according to a first operation parameter set corresponding to the application to retrieve digital contents through the network unit and to display the digital contents on the display unit.

According to another embodiment of the present invention, a method for retrieving digital contents of a virtual channel is provided. The method includes the following steps. At least one notification signal is received by an application executed by a network-based multimedia reproduction system. The application includes commands for retrieving digital contents through a network unit of the network-based multimedia reproduction system and displaying the digital contents on a display unit of the network-based multimedia reproduction system. In response to the at least one notification signal, each parameter of a first operation parameter set is accessed to retrieve the digital contents by the network unit accordingly. The first operation parameter set corresponds to a channel value and the application recorded in a virtual channel table. The virtual channel table is for virtual channel switching of applications of the network-based multimedia reproduction system.

The above and other aspects of the invention will become better understood with regard to the following detailed description of the preferred but non-limiting embodiments. The following description is made with reference to the accompanying drawings.

DETAILED DESCRIPTION OF THE INVENTION

A method for virtual channel management, a method for retrieving digital contents of a virtual channel, and a network-based multimedia reproduction system with virtual channels are described in the embodiments below. According to the embodiments, the technique of virtual channels is implemented in the network-based multimedia reproduction system to allow a user to activate an application or to switch to another application by way of channel switching, so that a user can select and watch desired digital contents with ease. For example, the network-based multimedia reproduction system is a display/playback system that can be connected to a multimedia source on the Internet (e.g., through wired or wireless approaches), such an Internet TV, a smart TV, an Internet multimedia player or device.

Figure 1:
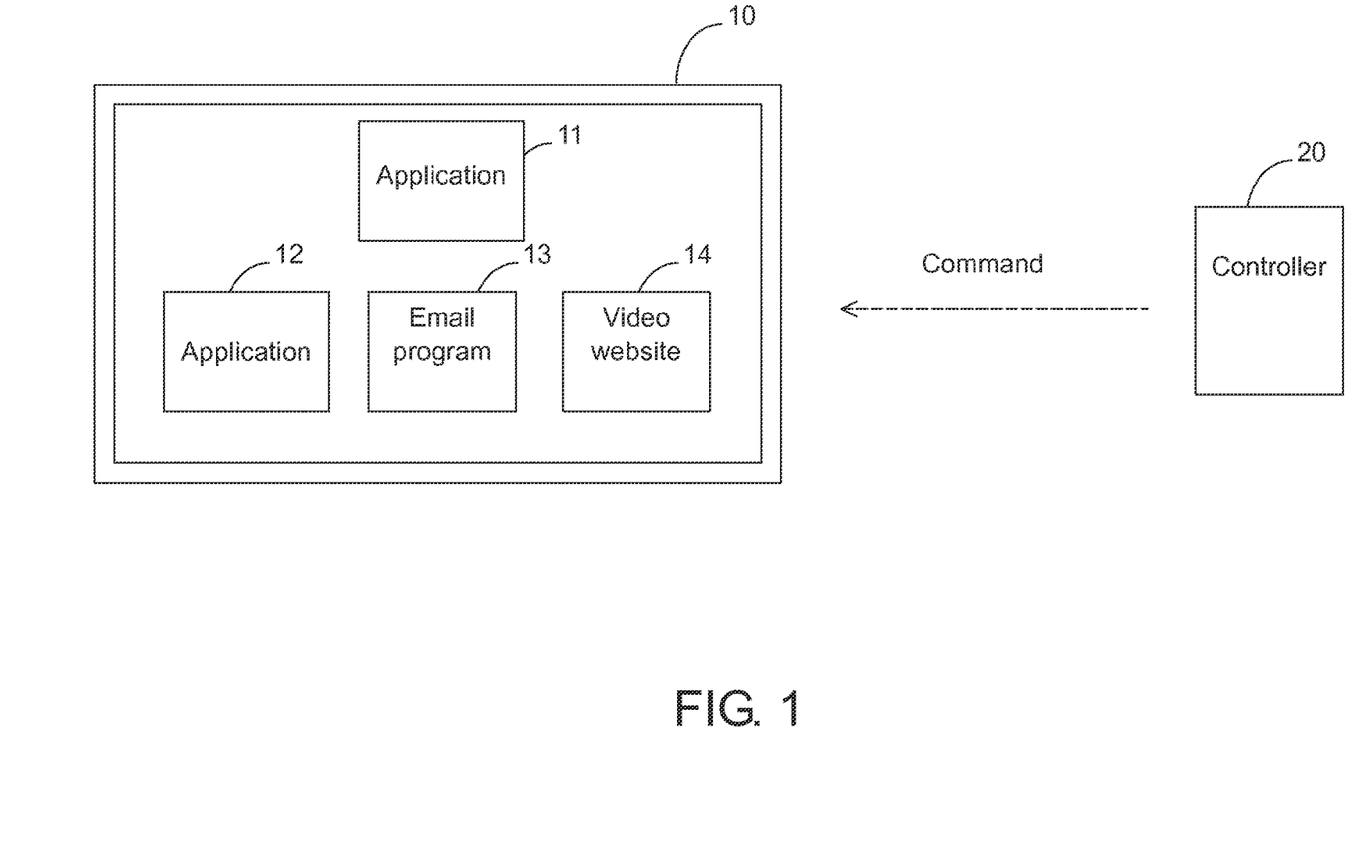
FIG. 1 is a schematic diagram of a network-based multimedia reproduction system with virtual channels, receiving a command associated with virtual channel switching.

In an embodiment, a virtual channel corresponds to an operation mode of an application. Selecting the virtual channel is to activate the corresponding application so as to display desired contents on a screen of the network-based multimedia reproduction system. In addition to a program to be installed such as an Internet TV application, an application may also be a request or use of network services such as applications including watching videos from a video sharing website (e.g., YouTube), browsing webmail (e.g., Gmail), chatting online (e.g., instant messaging tools), and browsing online photo albums. FIG. 1 shows a schematic diagram of a network-based multimedia reproduction system 10 with virtual channels and receiving a command associated with virtual channel switching. The network-based multimedia reproduction system 10 is capable of executing multiple applications 11 to 14 to display digital contents on a screen, e.g., in full screen or in other proportions. The network-based multimedia reproduction system 10 receives a command sent from a controller 20 (e.g., an electronic device such as a remote controller or a handheld device), and determines whether the command is associated with virtual channel switching. For example, in a mode of the network-based multimedia reproduction system 10, when a channel code 100 of the virtual channels is entered by a user, it means that the application 11 is executed to select and watch a particular online program. Similarly, pressing a channel value 200 of the virtual channels triggers the execution of the application 13 for browsing emails in an inbox of an email account. For another example, a channel jump or return, an input source change, a setting of a favorite channel list or an electronic program guide (EPG), performed on the controller 20 may all trigger channel switching.

Figure 2:
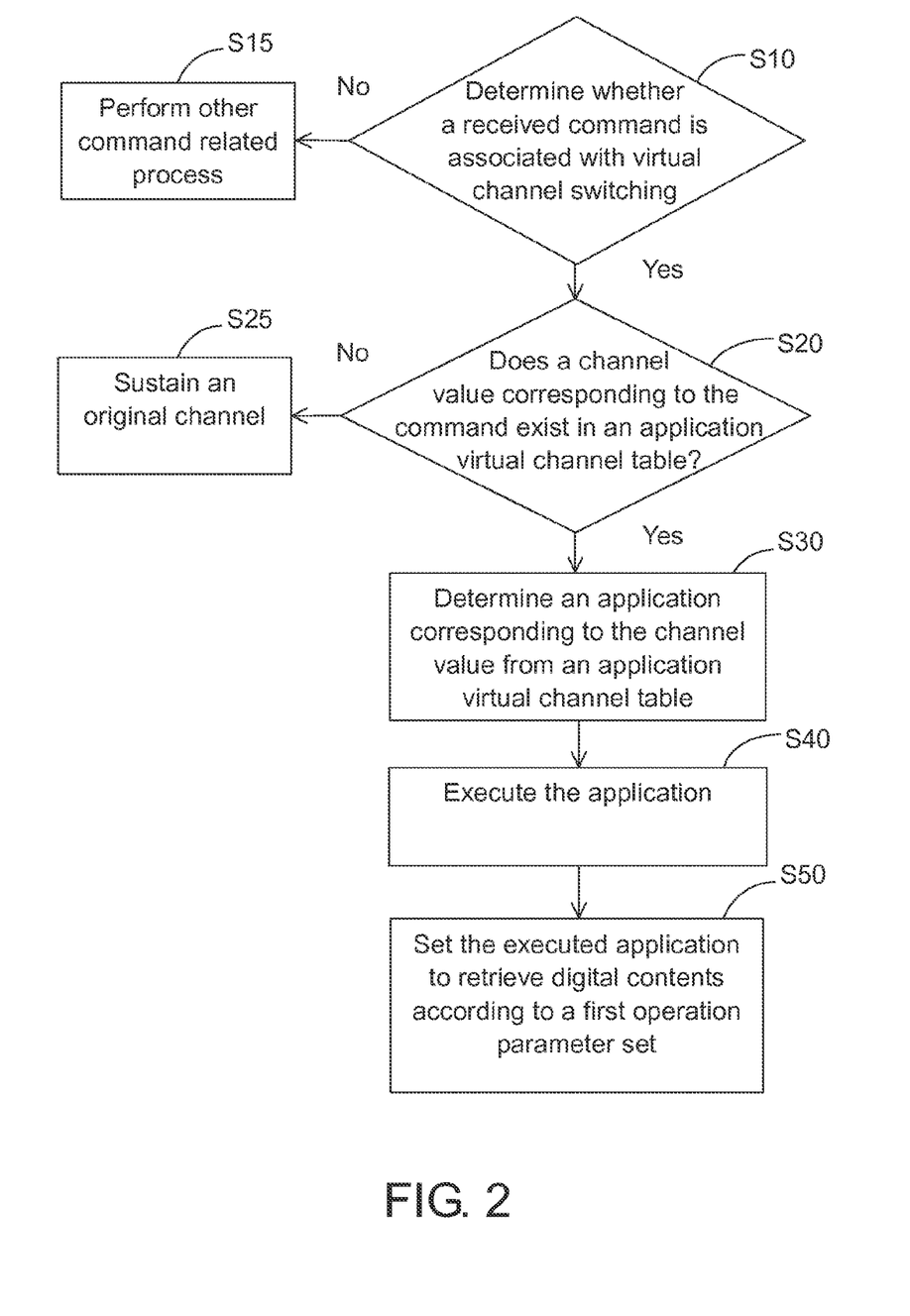
FIG. 2 is a flowchart of a method for virtual channel management according to an embodiment.
Figure 3:
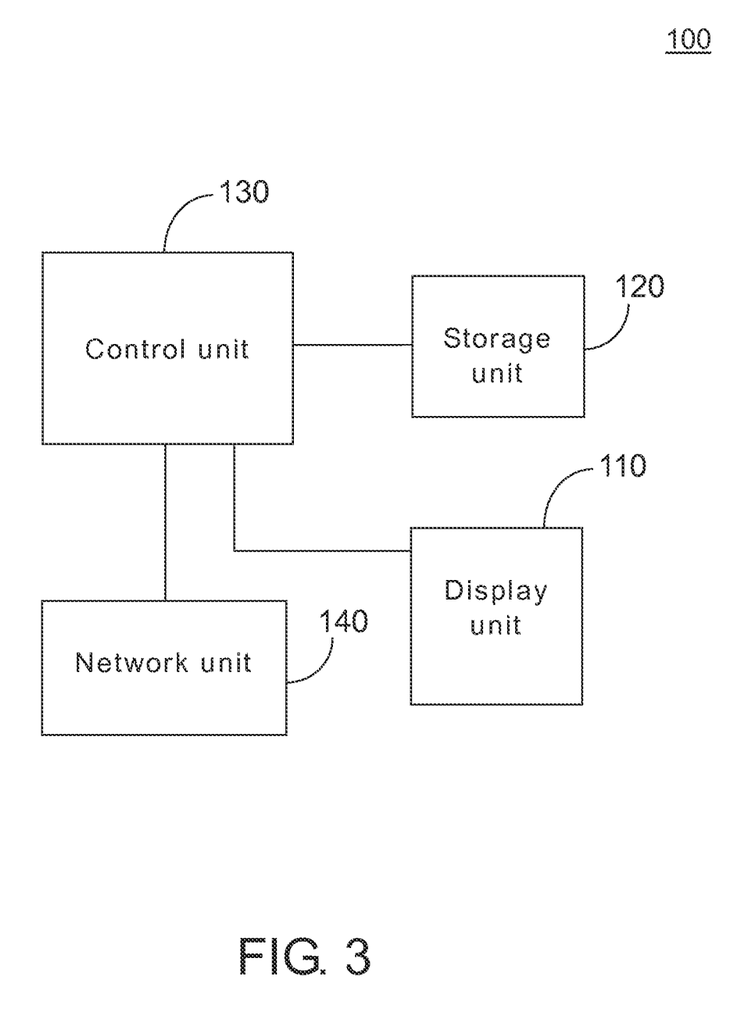
FIG. 3 is a fundamental structure of a network-based multimedia reproduction system with virtual channels according to an embodiment.

FIG. 2 shows a flowchart of a method for virtual channel management according to an embodiment. FIG. 3 shows a schematic diagram of a fundamental structure of a network-based multimedia reproduction system with virtual channels according to an embodiment. The method for virtual channel management in FIG. 2 may be performed by the structure in FIG. 3. Referring to FIG. 3, a network-based multimedia reproduction system 100 with virtual channels includes a display unit 110, a storage unit 120, a control unit 130, and a network unit 140. Depending on design requirements, the network-based multimedia reproduction system 100 may be further provided with other devices such as an analog or digital TV tuner, a command receiver such as physical buttons or keyboard, or a wired or wireless remote controller. In some embodiments, the network-based multimedia reproduction system 100 can be implemented to include circuitry for receiving analog or digital television channel signals for displaying or other functions, and to display or playing multimedia files stored in a storage unit (e.g., a flash drive, a hard drive and a system memory), such as photos, videos, audio files and music. Further, when the network-based multimedia reproduction system 100 is implemented as a network-based multimedia player, the display unit 110 may be implemented as a display screen integrated with the network-based multimedia player, or may be regarded as a display screen that connects to the network-based multimedia player with a wired or wireless connection.

With reference to FIG. 2, a method for virtual channel management according to an embodiment includes the following steps. In step S10, in response to a received command, the control unit 130 of the network-based multimedia reproduction system 100 determines whether the command is associated with virtual channel switching. For example, the received command is a signal generated and sent by the remote controller 20 on which a user presses an up or down arrow button, or entering a numerical code of a particular channel (e.g., a code of an arbitrary text or such as YouTube, mail or ABC, or a code such as 100 or 201). According to contents and properties of the signal, the control unit 130 determines whether the command is associated with virtual channel switching. For example, a channel selected by the user when the network-based multimedia reproduction system 10 is in a virtual channel mode is regarded as a virtual channel. Alternatively, for example, a channel that a user selects after pressing a specific button on the remote controller is regarded as a virtual channel. Approaches for determining whether the command is associated with virtual channel switching are not limited to the above examples, and may be implemented by various other methods. When the control unit 130 determines that the command is not associated with virtual channels switching, the method, as shown in step S15, may proceed with other process of the command, e.g., switching of other conventional wired or wireless channels, or other system functions or settings of the network-based multimedia reproduction system 10.

In step 20, when the command is associated with virtual channel switching, the control unit 130 checks whether a channel value corresponding to the command exists in an application virtual channel table, wherein the channel value may be a code or number as in the above examples. The application virtual channel table records a relationship between a virtual channel and a corresponding application. As shown in a column in Table-1, a channel 100 indicates that a corresponding application of a virtual channel is "YouTube Top 10", i.e., top ten videos on this video sharing website.

TABLE 1

| Virtual channel | Application | Parameter | Category |
|---|---|---|---|
| 100 | YouTube Top10 | Top10, AutoPlay, Repeat | Video |
| 200 | Email | Inbox | Email |
| 300 | Picassa | Default, AutoPlay | Image |
| 400 | Facebook | News Feed | Social network |
| 500 | Skype | Online | Instant messaging |
| 810 | PPTV | TopMovie, AutoPlay, Repeat | Video |
| 812 | PPTV | TopAnimation, AutoPlay, Repeat | Video |

When the channel value exists in the application virtual channel table, the control unit 130 determines an application corresponding to the channel value from the application virtual channel table, as shown in step S30. For example, a channel value "100", a corresponding application of "YouTube Top10" of a video sharing website is determined. When the channel value does not exist in the application virtual channel table, an original channel, e.g., a current channel or a predetermined channel is sustained, as shown in step S25.

In step S40, the control unit 130 executes the application. In step S50, the control unit 130 sets the executed application according to a first operation parameter set corresponding to the application so as to retrieve digital contents through a network unit 140 of the network-based multimedia reproduction system 100. For example, the first operation parameter set is obtained from the application virtual channel table. The application virtual channel table may include one or multiple virtual channels. In an embodiment, other data may be added into the application virtual channel table depending on actual requirements, e.g., an operation parameter set or application category. Referring to the exemplary columns of parameters in Table-1, an operation parameter set includes at least one operation command for controlling an application to retrieve desired digital contents associated with a corresponding virtual channel. For example, the operation parameter set corresponding to the channel 100 includes "Top10" representing a command for selecting top ten videos, "AutoPlay" representing a command for automatic playback, and "Repeat" representing a command for playback again. Details of other examples can be derived from Table-1 similarly. In another embodiment, the operation parameter set may be independent from the application virtual channel table, and is stored in a memory in the form of another data table. Further, the application virtual channel table may be implemented by a database or multiple databases.

Figure 4:
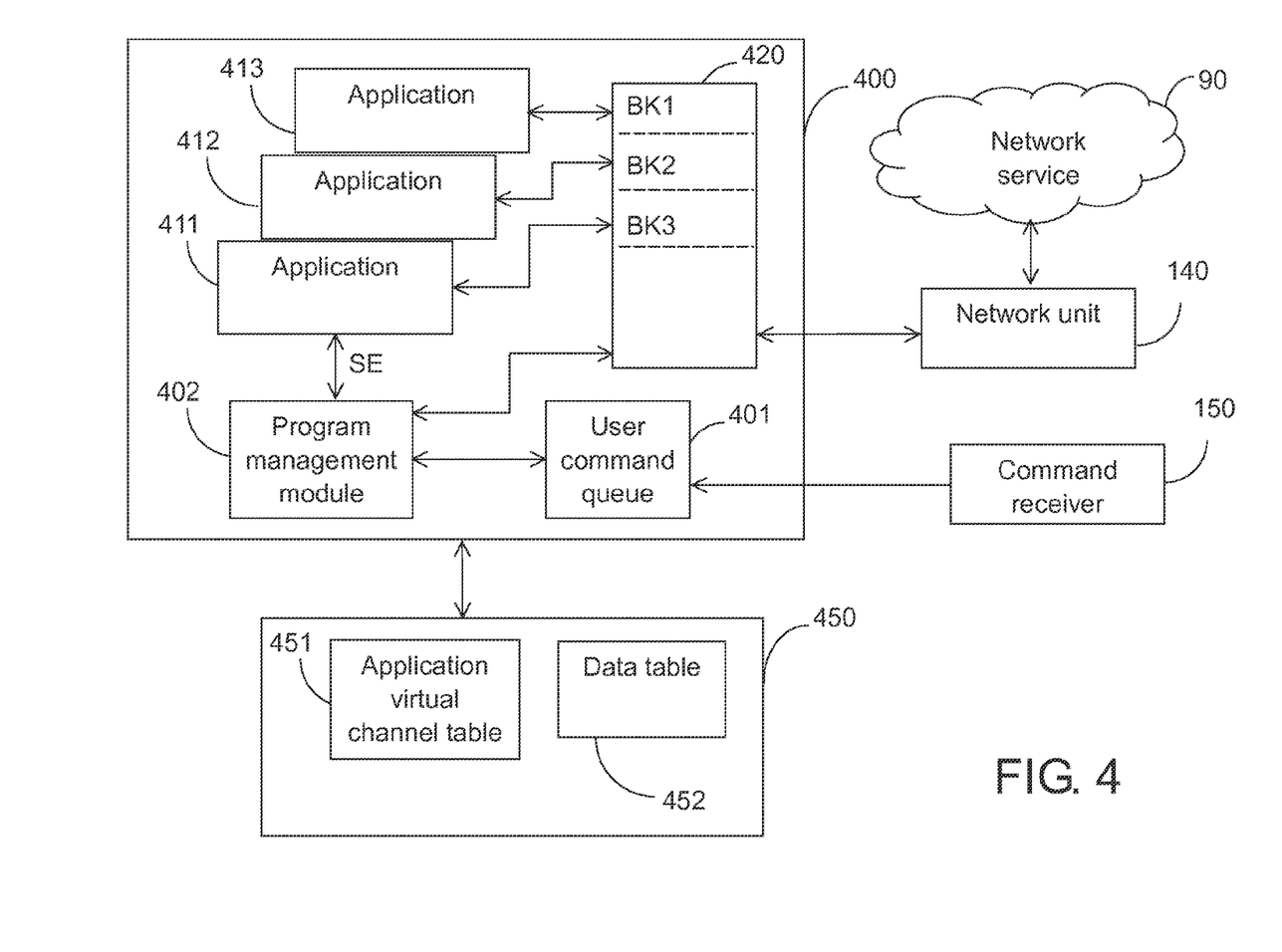
FIG. 4 is a schematic diagram of implementing virtual channels in a network-based multimedia reproduction system by use of the method of virtual channel management in FIG. 2 according to an embodiment.

FIG. 4 shows a method for virtual channel management in FIG. 2 for implementing virtual channels in a network-based multimedia reproduction system according to an embodiment. In this embodiment, the method for virtual channel management is implemented by a program management module 402, for example, under Android or another operating system. In another embodiment, the method may be implemented by multiple program modules. FIG. 4 illustrates a practical example for interactions and operations of the program management module 402, applications (e.g., 411 to 413) in a system memory 400 of the storage unit 120, and system hardware in the system circuit of the network-based multimedia reproduction system 100 of FIG. 3. Steps of the method for virtual channel management according to the embodiment can be performed by the control unit 130 in FIG. 3, e.g., a system-on-chip (SoC) or a single-core or multi-core processing unit, executing program code of the program management module 402.

The program management module 402 activates and manages an operation state, such as active or pending, of an application, and determines an operation of an application according to data in a user command queue 401 in the system memory 400. The system memory 400 stores applications in execution, e.g., 411, 412 and 413, and the program management module 402, and provides the user command queue 401 and a buffer 420. A non-volatile memory 450 such as a flash memory stores an application virtual channel table 451. Further, the non-volatile memory 450 may also store another data table 452, such as a channel list of wired or wireless television, applications, and other related data.

In an example, the application 411 needs to utilize an Internet service 90 such as a video sharing website, an online photo album, browsing webmail, or performing online communication. Data downloaded by the network unit 140 is temporarily stored in a memory region BK3 dedicated for the application 411 in the buffer 420. An application that has been activated can access data stored in its dedicated memory region of the buffer 420 so as to display or to execute corresponding functions. In addition to being buffered in the buffer 420, For example, certain data may also be stored to the non-volatile memory 450 or an external storage device such as a flash drive or a hard drive.

The signal transmitted from a controller 20 (e.g., a remote controller) by way of such as an infrared, Bluetooth, wired, or wireless link by a user is received by a command receiver 160 (e.g., an infrared receiver) of the network-based multimedia reproduction system 100, and stored in the user command queue 401.

The program management module 402 performs the steps of the method for virtual channel management according to the embodiment. In response to a received command in the user command queue 401, the program management module 402 determines whether the command is associated with virtual channel switching. When the command is associated with virtual channel switching, the program management module 402 retrieves an application (e.g., stored in a flash or another memory) corresponding to a channel number (e.g., 200) of the command with reference to the application virtual channel table, and loads the application to the system memory 400 for execution, as shown in step S40 in FIG. 2.

While the program management module 402 performs step S40, if the application (e.g., the application 412) corresponding to the channel value (e.g., 200) has been previously activated and is still stored in the system memory 400, the application 412 is directly set or changed to an active state. That is, the corresponding program code does not need to be fetched again from the flash or another memory.

Further, when the program management module 402 performs step S40, if the application corresponding to the channel value is not an application in execution (e.g., the application 411), the application in execution (e.g., the application 411) is set to a pending state and the application corresponding to the channel value is then executed after the corresponding program code is fetched from, for example, the flash or another memory. Further, in normal circumstances, only one application is in an active state, whereas other applications (e.g., the applications 411, 412 and 413) having been loaded to the system memory 400 are to be switched to a pending state.

Figure 5:
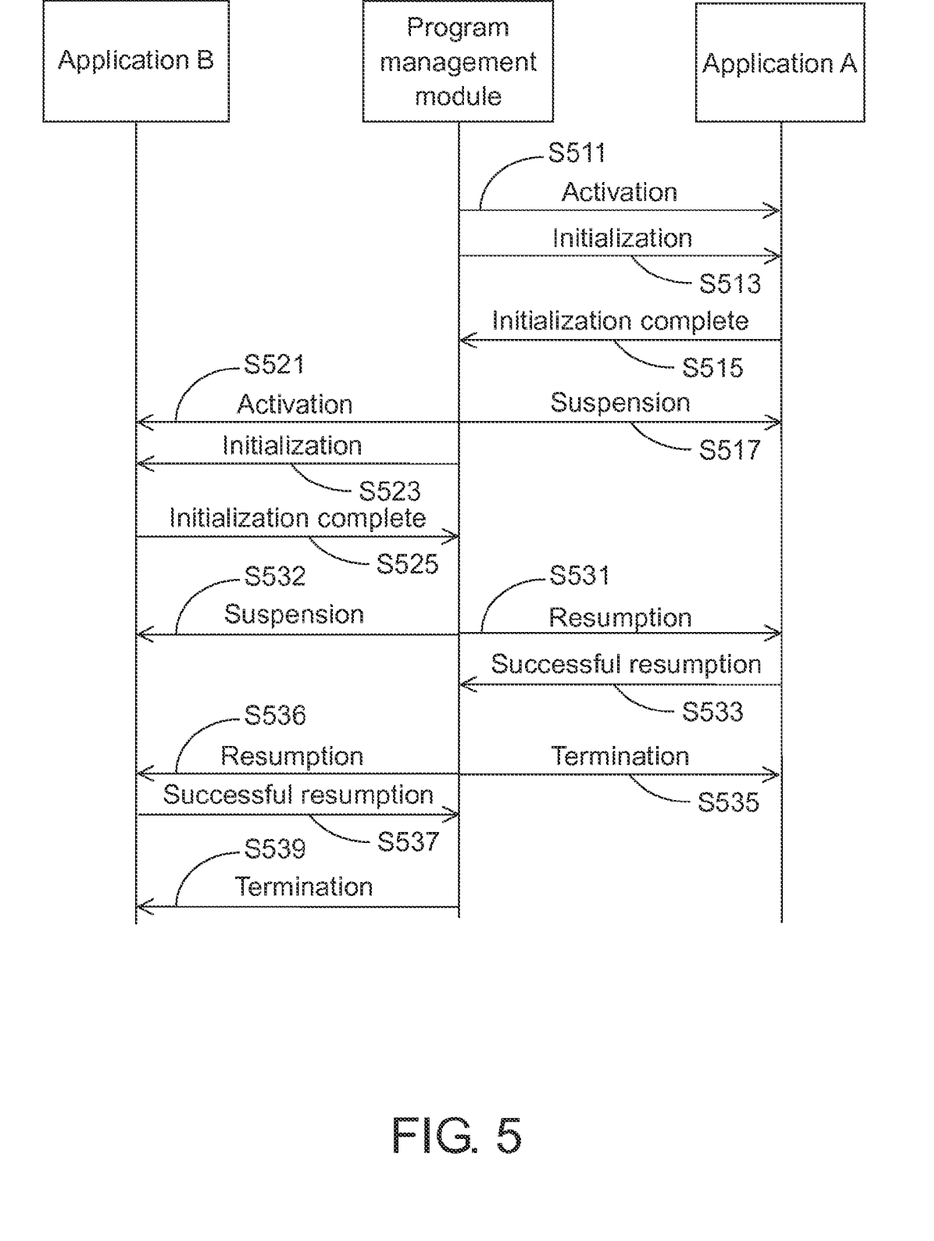
FIG. 5 is a sequence diagram of operations for virtual channel switching according to an embodiment.

FIG. 5 shows a sequence diagram of operations for virtual channel switching according to an embodiment. For example, when a user wishes to watch videos with top ten hit numbers on the video sharing website "YouTube", by entering a number "100" on a remote controller, the program management module 402 locates the application corresponding to "YouTube Top10" with reference to the application virtual channel table (as shown in Table-1). The application is then loaded and executed, so that the user can readily watch the videos. Referring to FIG. 5, step S511 indicates that the program management module 402 activates an application A, e.g., the application "YouTube Top10", to perform step S40 in FIG. 2. As shown in step S513, the program management module 402 sets initialization parameters of the application A to perform step S50 in FIG. 2 so as to activate the application A to reproduce the desired contents on a screen of the network-based multimedia reproduction system. Further, the application A may also be designed to report to or notify the program management module 402 after establishing a connection to the network service 90 (e.g., via a wired or wireless local area network (LAN), a broadband network, the Internet) and starting retrieving digital contents, i.e., after the initialization is completed.

In an example, the user next presses a "CH+" button (i.e., for switching to the next channel) on the remote controller. According to the application virtual channel table, the next channel value is "200" and corresponds to an email application. The previous application for watching the video website is switched to a pending state, and then the email application becomes usable for the user readily. As shown in step S521, the program management module 402 activates an application B, e.g., an email application, to perform step S40 in FIG. 2. Since the application B corresponding to the channel value 200 is not an application A in execution, the application A is set to the pending state and operations of the application A are suspended, as shown in step S517. In another embodiment, when the application A is suspended by the user, activating a next virtual channel may be done, i.e., to perform step S521. As shown in step S525, the program management module 402 sets initialization parameters of the application B to perform step S50 in FIG. 2 so as to activate the application B to reproduce the desired contents on the screen of the network-based multimedia reproduction system. Further, the application B may also be designed to report to or notify the program management module 402 after starting to retrieve digital contents, i.e., after the initialization is completed, as shown in step S525.

In another example, the user next presses a "CH-" button (i.e., for switching to the previous channel) on the remote controller or suspends operations of the application B. According to the application virtual channel table, the previous channel value is "100", which corresponds to the application A. As shown in step S531, the program management module 402 enables the application A to resume operations. That is to say, since the application A has been previously activated and is still stored in the system memory 400, the program management module 402 directly sets or switches the application A to an active state. Further, as shown in step S533, the application A may also be designed to report to or notify the program management module 402 after successfully resuming operations.

In further example, when the user terminates operations of the application A by use of the remote controller, as indicated in step S535, the program management module 402 terminates the execution of the application A. In this situation, the application A is no longer stored in the system memory 400. In another embodiment, when the user terminates the application A activating a next virtual channel may be done, i.e., to perform step S536. For another example, when the user presses the "CH+" button on the remote controller, as shown in step S536, the program management module 402 enables the application B to resume operations. Further, the application B may also be designed to report to or notify the program management module 402 after resuming operations, as shown in step S537. Moreover, the user may terminate operations of the application B by use of the remote controller, as shown in step S539. In this situation, the application B is no longer stored in the system memory 400.

In some embodiments, the program management module 402 may be designed to switch the screen of network-based multimedia reproduction system to display the digital contents received by the application in the active state, upon receiving the notification in step S515, step S525, step S533 and step S537.

Further, in the above embodiment, for example, the application connects to a network service (e.g., a file server, a website providing multimedia data streams or contents, or a cloud server) to retrieve digital contents via the network unit 140 such as a network interface for wired or wireless LAN or broadband network, based on IEEE 802.3, 802.11, or other network techniques.

Figure 6:
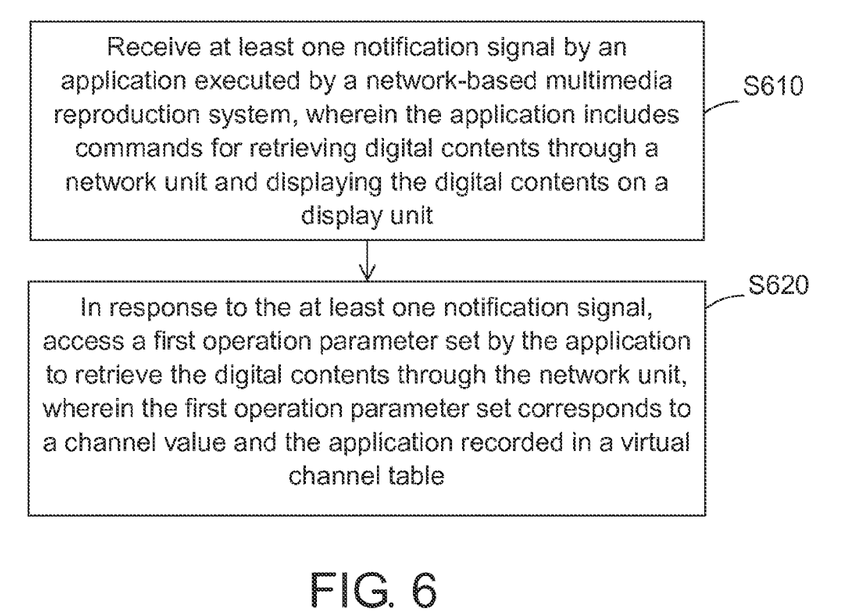
FIG. 6 is a flowchart of a method for retrieving digital contents of a virtual channel according to an embodiment.

FIG. 6 shows a flowchart of a method for retrieving digital contents of a virtual channel according to an embodiment. An application can be implemented according to the method for retrieving digital contents of a virtual channel to interact with a network-based multimedia reproduction system with virtual channels, so as to implement the technique for virtual channels for applications. Such technique facilitates convenient and ready-to-use channel switching operations for users. Referring to FIG. 6, a method for retrieving digital contents of a virtual channel according to an embodiment includes the following steps.

In step S610, at least one notification signal SE (e.g., transmitted from the control unit 130 when the program management module 402 is executed) is received by an application (e.g., the application 411 in FIG. 4) executed by a network-based multimedia reproduction system, e.g., with a processing unit thereof (e.g., the control unit 130 in FIG. 3). The application includes commands for retrieving digital contents through a network unit (e.g., the network unit 140) and displaying the digital contents on a display unit (e.g., the display unit 110).

In step S620, in response to the at least one notification signal SE, the application executed by the processing unit accesses a first operation parameter set (e.g., one or more parameters) from a memory (e.g., the buffer 420 or another memory region such as a stack in the system memory 400, the non-volatile memory 450, or an external memory) to retrieve the digital contents through the network unit accordingly. The first operation parameter set corresponds to a channel value and the application recorded in a virtual channel table. The virtual channel table is employed for virtual channel switching of applications of the network-based multimedia reproduction system.

Figure 7:
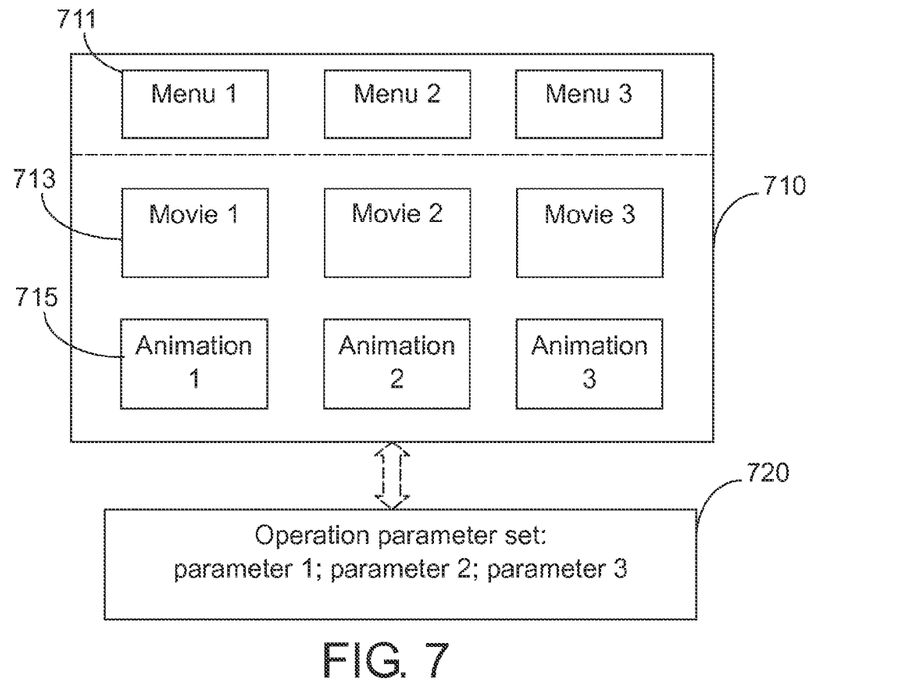
FIG. 7 is a schematic diagram illustrating an application and a corresponding operation parameter set according to an embodiment.

FIG. 7 shows a schematic diagram of an application and a corresponding operation parameter set according to an embodiment. Since each application has its dedicated user operation interface and approach for providing contents, a user usually needs to learn and adapt to the different operation approaches. In addition, a user may be required to select desired contents by using some buttons of a remote controller, such as four direction buttons (i.e., up, down, left and right arrow buttons), a confirm or select button, and a back or return button. In FIG. 7, an application 710 is an Internet TV browser application for PPTV, for example. After the application is activated, a user interface of the application may include multiple menus 711, a number of icons 713 representing movies, or a number of icons 715 representing animations.

The operation parameter set 720 corresponding to the application may include one or more parameters, e.g., parameter 1, parameter 2, and parameter 3. These parameters correspond to a virtual channel and correspond to operations for activating the application to display the desired contents on a screen of the network-based multimedia reproduction system. For example, in the network-based multimedia reproduction system, the virtual channel table and the operation parameter set may be predetermined, configured by a user, or obtained from other sources. Thus, a virtual channel 810 may be set to correspond to an Internet TV application (e.g., a PPTV application) that automatically plays three most popular movies. Specifically, the operation parameter set in this example may be set as: selecting three most popular movies (represented by a parameter "TopMovie"), automatically playing the three selected movies (represented by a parameter "AutoPlay", and repeating the three selected movies (represented by a parameter "Repeat"). The above parameters may generally refer to data for interacting with the network-based multimedia reproduction system (e.g., by way of a program management module). Such data may be commands, setting values required by the commands, response, or notification messages, or other data.

In an embodiment, an application, implemented according to the method for retrieving digital contents of virtual channels, may be designed to include or provide at least one application programming interface for interacting with the network-based multimedia reproduction system. In addition, the application may be designed to interpret and respond to parameters sent from the control unit 130 of the network-based multimedia reproduction system and to allow the network-based multimedia reproduction system to control behaviors of the application. Thus, the technique of virtual channels for the application can be implemented to facilitate convenient channel switching operations for a user, thereby simplifying the user's operations or avoiding complicated user's operations with the remote controller.

In some embodiments, a network-based multimedia reproduction system with virtual channels may be configured, such as providing other functions or applications by the control unit 130. For example, when a user enters the virtual channel number "810" on the remote controller, an application such as one for PPTV is activated, and a series of previews of videos or programs are automatically played. Further, channel values or corresponding program names of the videos or programs can be displayed as the series of previews are played, or a channel number or a corresponding program name is displayed for the sake of the user's selection.

The behaviors of the application A in FIG. 5 may be regarded as a step for setting initialization parameters such as step S513, or may be regarded as another embodiment of the method for retrieving digital contents of a virtual channel. Steps in FIG. 6 may be regarded as an embodiment of step S513 for setting the initialization parameters in FIG. 5.

Other embodiments further disclose a non-transitory computing apparatus readable storage medium for storing program code of one or more programs or program modules for the virtual channel technique. In one embodiment, the program code may implement and perform, when executed, a method according to FIG. 2, e.g., as system software of the network-based multimedia reproduction system. In another embodiment, the program code may implement and perform, when executed, a method according to FIG. 4, 5, or 6, e.g., as an application for the network-based multimedia reproduction system. The readable storage medium in each of the embodiments may be, without limitation to, an optical information storage medium, a magnetic information storage medium, or a memory, such as a memory card, flash memory, firmware, ROM or RAM.

With the above embodiments, the method for virtual channel management, the method for retrieving digital contents and the network-based multimedia reproduction system are provided. According to some of the embodiments, the network-based multimedia reproduction system implements the technique of virtual channels so that a user can activate an application or switch to another application by way of channel switching and conveniently select and watch desired digital contents. According to some of the embodiments, an application can interact with the network-based multimedia reproduction system with virtual channels, and the network-based multimedia reproduction system can then control the application according to operational behaviors represented by the operation parameter set, so that the user may conveniently select and watch desired digital contents.

Therefore, the network-based multimedia reproduction system offers a convenient and ready-to-use application platform for providing videos and digital contents in a household or in a group to bring users with enhanced user experiences. Without performing sophisticated operations of applications, the technique of virtual channels can be implemented in the network-based multimedia reproduction system to significantly promote the practicability of the above application platform, more particularly for young and elderly users.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for virtual channel management, for use in a network-based multimedia reproduction system, the method comprising:
   in response to a command, determining, by a control unit of the network-based multimedia reproduction system, whether the command is associated with virtual channel switching;
   when the command is associated with virtual channel switching, checking whether a channel value corresponding to the command exists in an application virtual channel table by the control unit;
   when the channel value exists in the application virtual channel table, determining an application and a first parameter set corresponding to the channel value from the application virtual channel table by the control unit;
   executing the application by the control unit; and
   setting, by the control unit, the executed application to be automatically controlled to retrieve digital contents according to the first operation parameter set through a network unit of the network-based multimedia reproduction system;
   wherein the first operation parameter set corresponds to operations for activating the application to display the digital contents on a display unit of the network-based multimedia reproduction system.

2. The method for virtual channel management according to claim 1, wherein the step of executing the application comprises:
   when the application has been activated, setting the application to an active state to execute the application.

3. The method for virtual channel management according to claim 2, wherein the step of executing the application further comprises:
   when the application corresponding to the channel value is not an application in execution, setting the application in execution to a pending state, and executing the application corresponding to the channel value.

4. The method for virtual channel management according to claim 3, wherein the application virtual channel table includes the first operation parameter set corresponding to the application.

5. The method for virtual channel management according to claim 1, wherein the step of setting the executed application to retrieve the digital contents through the network unit of the network-based multimedia reproduction system comprises:
   storing the first operation parameter set to a memory of the network-based multimedia reproduction system by the control unit; and
   notifying, by the control unit, the executed application to access parameters of the first operation parameter set from the memory, and accordingly setting the executed application to retrieve the digital contents.

6. The method for virtual channel management according to claim 5, wherein the first operation parameter set comprises at least one operation command for controlling the application to retrieve the digital contents.

7. The method for virtual channel management according to claim 6, wherein the application virtual channel table includes the first operation parameter set corresponding to the application.

8. A network-based multimedia reproduction system with virtual channels, comprising:
   a display unit;
   a storage unit, for storing an application virtual channel table;
   a control unit, in response to a command, operative to determine whether the command is associated with virtual channel switching, wherein the control unit is operative to check whether a channel value corresponding to the command exists in an application virtual channel table when the command is associated with virtual channel switching; and the control unit is operative to determine an application and a first parameter set corresponding to the channel value from the application virtual channel table and to execute the application when the channel value exists in the application virtual channel table; and
   a network unit, wherein the control unit sets the executed application according to the first operation parameter set to be automatically controlled to retrieve digital contents through the network unit and to display the digital contents on the display unit;
   wherein the first operation parameter set corresponds to operations for activating the application to display the digital contents on the display unit.

9. The network-based multimedia reproduction system with virtual channels according to claim 8, wherein when the application has been activated, the control unit sets the application to an active state to execute the application.

10. The network-based multimedia reproduction system with virtual channels according to claim 9, wherein when the application corresponding to the channel value is not an application in execution, the control unit sets the application in execution to a pending state, and executes the application corresponding to the channel value.

11. The network-based multimedia reproduction system with virtual channels according to claim 10, wherein the application virtual channel table includes the first operation parameter set corresponding to the application.

12. The network-based multimedia reproduction system with virtual channels according to claim 8, wherein the control unit stores the first operation parameter set in a memory of the network-based multimedia reproduction system, and notifies the executed application to access parameters of the first operation parameter set and to retrieve the digital contents accordingly.

13. The network-based multimedia reproduction system with virtual channels according to claim 12, wherein the first operation parameter set comprises at least one operation command for controlling the application to retrieve the digital contents.

14. The network-based multimedia reproduction system with virtual channels according to claim 13, wherein the application virtual channel table includes the first operation parameter set corresponding to the application.

15. A method for retrieving digital contents of a virtual channel, comprising:
   receiving at least one notification signal by an application executed by a network-based multimedia reproduction system, wherein the application includes commands for retrieving digital contents through a network unit of the network-based multimedia reproduction system and displaying the digital contents on a display unit of the network-based multimedia reproduction system; and
   in response to the at least one notification signal, accessing a first operation parameter set from an application virtual channel table by the application to be automatically controlled to retrieve the digital contents through the network unit accordingly, wherein the first operation parameter set corresponds to a channel value and the application recorded in the application virtual channel table, and the application virtual channel table is for virtual channel switching of applications of the network-based multimedia reproduction system;
   wherein the first operation parameter set corresponds to operations for activating the application to display the digital contents on the display unit of the network-based multimedia reproduction system.

16. The method for retrieving digital contents of a virtual channel according to claim 15, wherein the first operation parameter set comprises at least one operation command for controlling the application to retrieve the digital contents.

17. The method for retrieving digital contents of a virtual channel according to claim 16, wherein the application virtual channel table includes the first operation parameter set corresponding to the application.

\* \* \* \* \*